(12) United States Patent
Lopez

(10) Patent No.: US 10,687,452 B2
(45) Date of Patent: Jun. 23, 2020

(54) MULTIFUNCTIONAL IMPLEMENT FOR FARMING AND GARDENING

(71) Applicant: Kristin Hilma Lopez, Longmont, CO (US)

(72) Inventor: Gilbert Thomas Lopez, Longmont, CO (US)

(73) Assignee: Kristin Hilma Lopez, Longmont, CO (US)

( * ) Notice: Subject to any disclaimer, the term of this patent is extended or adjusted under 35 U.S.C. 154(b) by 0 days.

(21) Appl. No.: 14/629,438

(22) Filed: Mar. 23, 2015

(65) Prior Publication Data

US 2016/0278274 A1    Sep. 29, 2016

(51) Int. Cl.
*A01B 49/06* (2006.01)
*A01C 7/20* (2006.01)
(Continued)

(52) U.S. Cl.
CPC ............ *A01B 49/06* (2013.01); *A01B 33/021* (2013.01); *A01C 5/06* (2013.01); *A01C 7/06* (2013.01); *A01C 7/203* (2013.01); *A01C 15/007* (2013.01)

(58) Field of Classification Search
CPC ......... A01B 49/06; A01B 49/04; A01B 49/00; A01B 33/021; A01B 33/02; A01B 33/00;
(Continued)

(56) References Cited

U.S. PATENT DOCUMENTS 3,807,506 A  *  4/1974  Penley ................. A01B 33/028
                                          172/42
4,286,671 A  *  9/1981  Mays ....................... A01B 3/58
                                         172/253
(Continued)

FOREIGN PATENT DOCUMENTS

CN        201797714 U  *  4/2011
JP         02138903 A  *  5/1990
JP         09037602 A  *  2/1997

*Primary Examiner* — Christopher J. Novosad
(74) *Attorney, Agent, or Firm* — MP Patents, LLC

(57) ABSTRACT

The instant invention is a machine/implement used for soil preparation, fertilizing and seeding intended for farming and gardening that mounts on a standard three point hitch and is powered by a tractor's power-take-off (PTO). The implement integrates the processes of ground breaking, tilling, fertilizing and planting in one adjustable unit. The adjustments include the spacing and depth of the ground cutting and tilling blades and the openings of the fertilizing ports to prepare the ground for planting in defined strips leaving the majority of ground only lightly disturbed. To achieve these goals, the apparatus is comprised of two frames, a lower one that contains the blades that break the ground crust ahead of the tiller tines that grind the soil into finer particles for planting. The lower frame also has a rear flap that levels and marks the tilled soil and also supports seed boxes with a mechanism that allows the seeder/seeders to set seed at a constant depth on uneven ground. The spacing of the seed boxes are determined by mounting holes in the apron. The upper detachable frame contains a bin that filters, holds and (Continued)

dispenses fertilizer by mixing it down through adjustable ports directly above and forward of the tiller blades to be mixed with the earth during tilling thus making it possible to break the ground, till, fertilize and seed in a single pass.

17 Claims, 4 Drawing Sheets

(51) Int. Cl.
*A01B 33/02* (2006.01)
*A01C 15/00* (2006.01)
*A01C 7/06* (2006.01)
*A01C 5/06* (2006.01)

(58) Field of Classification Search
CPC .... A01C 5/06; A01C 5/00; A01C 7/06; A01C 7/00; A01C 7/203; A01C 7/201; A01C 7/20; A01C 15/007; A01C 15/006; A01C 15/005; A01C 15/00
See application file for complete search history.

(56) References Cited

U.S. PATENT DOCUMENTS

| | | | | |
|---|---|---|---|---|
| 4,512,413 | A * | 4/1985 | Hirata | A01B 33/082 172/125 |
| RE32,467 | E * | 8/1987 | Mays | A01B 3/58 172/253 |
| 4,909,334 | A * | 3/1990 | Tanner | A01B 33/04 172/26 |
| 4,967,849 | A * | 11/1990 | Kincaid | A01B 71/08 172/39 |
| 5,095,996 | A * | 3/1992 | Sprinkle | A01B 33/028 172/354 |
| 5,197,551 | A * | 3/1993 | Farley | A01B 33/028 172/351 |
| 6,131,670 | A * | 10/2000 | Johnson | A01B 73/00 172/681 |

* cited by examiner

MULTIFUNCTIONAL IMPLEMENT FOR FARMING AND GARDENING

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

This invention relates to the fields of farming and gardening and to the method of low-till whereby the implement can eliminate plowing and reduce the overall energy required to fertilize and till the soil while preparing it for planting.

BACKGROUND

Recently the support of sustainable farming has increased for many reasons. Among those are soil depletion, contamination from chemicals, climate change, as well as an increasing desire by people to purchase food grown locally. The main implements used in farming and gardening are: plows, harrows, rotary tillers, manure spreaders and seeders and they all are normally used separately requiring expensive labor, time and fuel to plant a field. No-till and low-till methods are becoming widely popular by cutting the expense of plowing and heavy tilling. The movement toward sustainable farming has created a need for a compact unit that can accomplish the basic functions of traditional farming machinery and can be used on small or large acreages in a low-till mode reducing labor and eliminating or reducing plowing, the use of fuel, synthetic fertilizer, herbicides and pesticides.

U.S. Pat. No. 2,556,072 to Dewey 1948 Planter shows a multifunctional implement intended for planting in rubble. It includes ground breaking, fertilizing, rotary tilling and seeding tools. It does not show a way to mount the tractor via a 3 point hitch. The invention requires a complex series of right angle gears mounted in several places to the tractor frame. This configuration would make it cost prohibitive to mount on any modern (post 1960) tractors. Additionally, the fertilizer bins as shown are of the type that process fertilizer in pellet or granulated form. As described the invention could not fertilize with raw animal manure.

U.S. Pat. No. 6,131,670 Johnson 2000 Rotary tiller attachment to facilitate towing shows how to pull implements with a walking rotary tiller but not a riding tractor and not a fertilizing implement.

U.S. Pat. No. 5,197,551 Farley 1993 extended drag tool for a front tine tiller is only for a front tine walking tiller but mentions nothing related to fertilizing or seeding.

U.S. Pat. No. 5,095,996 Sprinkle rotary tilling attachment for facilitating turning again only addresses modifications for walking tractors. The invention is not a multi-functioning implement and does not suggest a fertilizing attachment.

U.S. Pat. No. 4,967,849 Kincaid Guard assembly for earth tillers Is a guard for tiller tines and nothing else.

U.S. Pat. No. 4,909,334 Tanner et al. Machine for filling ruts in an agricultural field presents a machine for filling ruts and has no other function U.S. Pat. No. 4,512,413 Hirata Rotary cultivating apparatus of laterally shiftable type shows and relates to a rotary tiller that can be shafted in the lateral direction. It does not suggest a multifunctional implement nor a fertilizing apparatus.

U.S. Pat. No. 4,286,671 Mays Sep. 1, 1981 Kit for converting a rotary tiller into a plow relates to a walking tiller only.

U.S. Pat. No. 3,807,506 Penley 1974 Cultivating Assembly Is simply a way of modifying a walking rotary tiller to perform as a cultivator. It does not suggest a multifunctional implement nor a fertilizing apparatus.

U.S. Pat. No. 4,381,118 A Weeks (1983) Multi-hitch apparatus for tandem towing of farm implements shows a way to combine functions in tandem but lacks the compactness desired on small farms.

U.S. Pat. No. 5,715,892 A to Foster (1998) Leveling harrow posits a harrow used for breaking ground where crop residue is abundant. It also has leveling qualities but does not grind the residue into the soil under PTO power nor does it have a mounting feature for a seeder or a fertilizer box.

U.S. Pat. No. 987,388 A to Marsht (1911) Fertilizer-drill attachment to cultivators and plows describes a fertilizer bin mounted on a plow or cultivator and a mixing wheel to churn the fertilizer for free flow but has no way to meter the output evenly other than the orifice at the output. This claim is ancient but it hints at the diversity needed in farm tools.

U.S. Pat. No. 7,753,133 B2 Skolness (2009) Crust fracturing implement describes a method of breaking the crust of the ground using rotary tines to prepare the ground for seeding but does not penetrate the soil deeper than a few inches, does not have positive depth control and does not till the complete area to disparage weeds, does not have a leveling apron and does not mark the prepared soil for seeding nor does it have a mounting features for a seeder or a fertilizer box.

U.S. Pat. No. 2,864,293 Foltzer et al (1958) Garden tool combinations discusses a design that uses a single power module to attach a rotary tiller, mower and more but does not address any actual gardening processes.

U.S. Pat. No. 4,386,661 A McCanse, Dhaliwal (1983) Rear mounted rotary tiller shows a traditional rotary tiller design that is powered by a tractor normally used for grinding the soil prior to planting but does not provide adjustable depth control or adjustable row marking skids nor does it have mounting features for a seeder or a fertilizer box.

U.S. Pat. No. 3,743,023 Bedwell (1973) Control for ground tools of farm implements is stated as a control for farm implements which provides the alternative of raising and lowering a pair of the ground-engaging tools as a unit or individually and relative to each other yet is not compact and does not discuss fertilizing or seeding in the same implement.

U.S. Pat. No. 5,086,847 Meiners (1992) Height adjustment mechanism for farm implements is another way to control depth of tools but doesn't address combining separate tools into one implement.

CN 202514293 U Foreign inventor (1999) Multipurpose farm implements relates only to deep plowing collecting stubbles, loosening soil but doesn't include fertilizing or seeding.

U.S. Pat. No. 3,128,729A Henson (1964) All purpose farm machine is a multi functional farming system that performs a multitude of farm operations however the design is cumbersome and requires significant modifications to a tractor.

CONCLUSION

Prior art does reveal implements with many of the same features included in this application. However, this invention specifically introduces components that are not found in prior art particularly the fertilizing bin apparatus with a fertilizer filter screen that has the ability for processing raw animal manure and other materials readily found around the farm or garden.

Additionally, nowhere in the search results is mentioned a compact farming and gardening implement which features ground breaking, fertilizing rotary tilling, seeding and planting capabilities in a single compact unit that is also capable of attaching to the majority of modern tractors equipped with a three point hitch. This feature, presented herein, increases the usefulness of the invention considerably over all prior art.

Lastly, the instant invention introduces a new system to connect, disconnect, and control the function of the rear hinge plate/apron saving time and without the need for hand tools.

SUMMARY OF THE INVENTION

The instant invention is a farming and gardening implement designed to reduce machine time and labor in the process of farming and gardening by combining the functions of ground breaking, rotary tilling, marking and seeding with a fertilizing bin apparatus that can use readily available animal manure or compost. By incorporating the functions here mentioned into a single implement and including connections for a three point hitch compatible with the majority of modern tractors, the invention can save the time and effort lost when implements are incorporated separately. To accomplish these goals, the implement consists of a central frame that connects to a standard three point hitch. The frame supports a ground crust breaking apparatus with cutting blades and a rotary tiller as well as a platform for a fertilizing bin apparatus, rear hinge apron, seeder boxes and seed bed marking tools. A further purpose of the invention is to include a filter screen in the fertilizing bin apparatus to filter compost or animal fertilizer from readily available sources including cow, horse, goat, sheep, chicken or pig manure. A further purpose of the invention is to include in the fertilizing bin apparatus vibrator bars that help move the fertilizer downward as well as helping to break down remaining fertilizer chunks. A further purpose of the implement is to minimize disturbance of the ground, saving time and energy while allowing a majority of the soil to remain undisturbed. Still further, the implement provides more precise depth control by attaching an adjustable stand/skid apparatus to the main frame whereby the depth of the ground crust-breaking blades and rotary tiller tines can be adjusted independently. Still further the adjustable skids can be set to serve as a stand to position the implement for connection and disconnection. A further purpose of the implement is to provide a rear hinge plate/apron that levels the ground and marks the lines to be planted. Sill further the rear hinge plate/apron includes holes that can be used for mounting seed boxes. Still further the rear hinge plate/apron can be removed without tools for cleaning the rotary tiller tines.

OBJECTS OF THE INVENTION

The primary object of the invention is to provide farmers and gardeners with a multifunctional implement that can save time and labor while performing a multitude of tasks.

Another object of the invention is to reduce the cost of equipment by providing a single implement that will perform the functions of several individual implements.

Another object of the invention is to eliminate plowing when preparing the ground for planting.

Another object of the invention is to provide an adjustable stand/skid system for the rotary tiller to accurately control the depth of the tiller blades and the ground breaking blades.

Another object of the invention is to provide an adjustable stand/skid system that will support the tiller when detached from a tractor in a position where it can be quickly reconnected.

Another object of the invention is to provide a feature that will allow chisel blades to break the crust of the ground in front of the tiller tines.

Another object of the invention is to provide greater flexibility by allowing for the tilling blades to be positioned for tilling the entire width of the frame or in narrow lanes to tumble the earth only in the rows to be planted.

Another object of the invention is to add an apparatus to the tiller frame that can level the ground as it tills.

Another object of the invention is to have a quick release method of removing the rear tiller apron for cleaning the tines and mounting attachments.

Another object of the invention is to include a method of attaching marking skids for hand seeding or seed boxes for seeding directly.

Another object of the invention is to provide a mount for seeder boxes that will allow for accurate depth control of the seed as the implement encounters uneven ground.

Another object of the invention is to save steps by including a fertilizer bin that can dispense fertilizer at the same time the ground is being tilled.

Another object of the invention is to provide a screen for the fertilizer apparatus to filter animal fertilizer into the hopper including any mixture of any animal manure as well as, but not limited to compost, sawdust or any other soil amendments.

Another object of the invention is to reduce the use of fertilizer by applying it only in the rows to be planted.

Another object of the invention is to reduce weed growth by applying fertilizer only in the rows to be planted.

DETAILED DESCRIPTION OF THE PREFERRED EMBODIMENT

Figure 1:
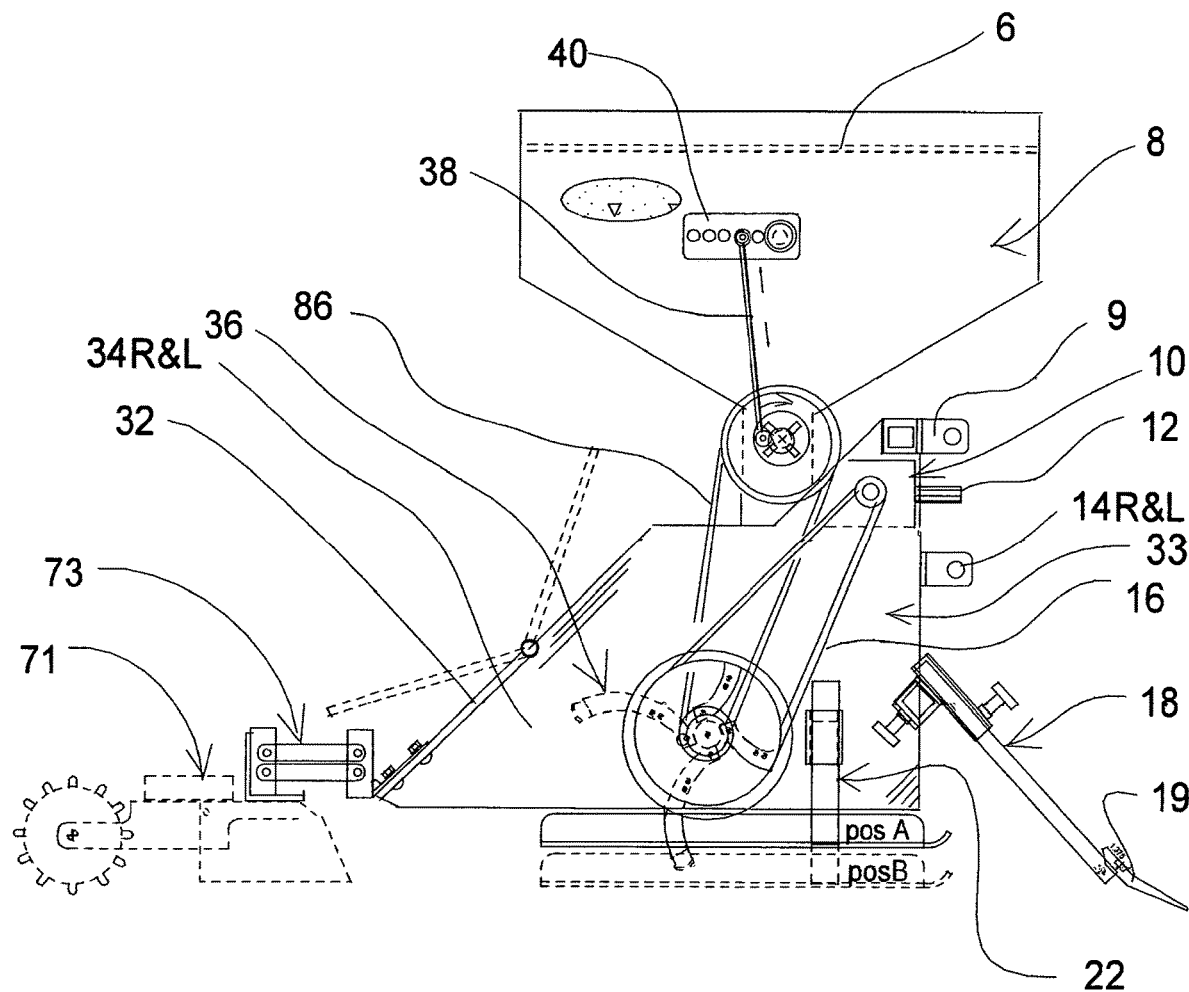
FIG. 1 is a right side view of the invention showing the placement of its main components.

Referring to FIG. 1 for a right side elevation of the preferred embodiment of the instant invention it is seen that a frame 34L&R of a tiller assembly 33 supports connector bars 9 along with 14R & 141 that supply attachment points for a three point tractor hinge. A gearbox 10 acquires power through a splined shaft 12 when connected to a tractor PTO (power-take-off). Frame 34R&L also supports a fertilizer bin apparatus 8 and a ground breaker assembly 18 as well as a rear hinge plate 32 and a stand/skid apparatus 22. The adjustment 22 as shown in position A is for controlling rotary tiller tine 36 depth and in position B for disengagement and free standing. Also seen in FIG. 1 is a preferred embodiment of a seed box hinge apparatus 73. Also shown are connecting rod 38 and the vibration connecting bar 40 as they are connected to bin 8.

Figure 2:
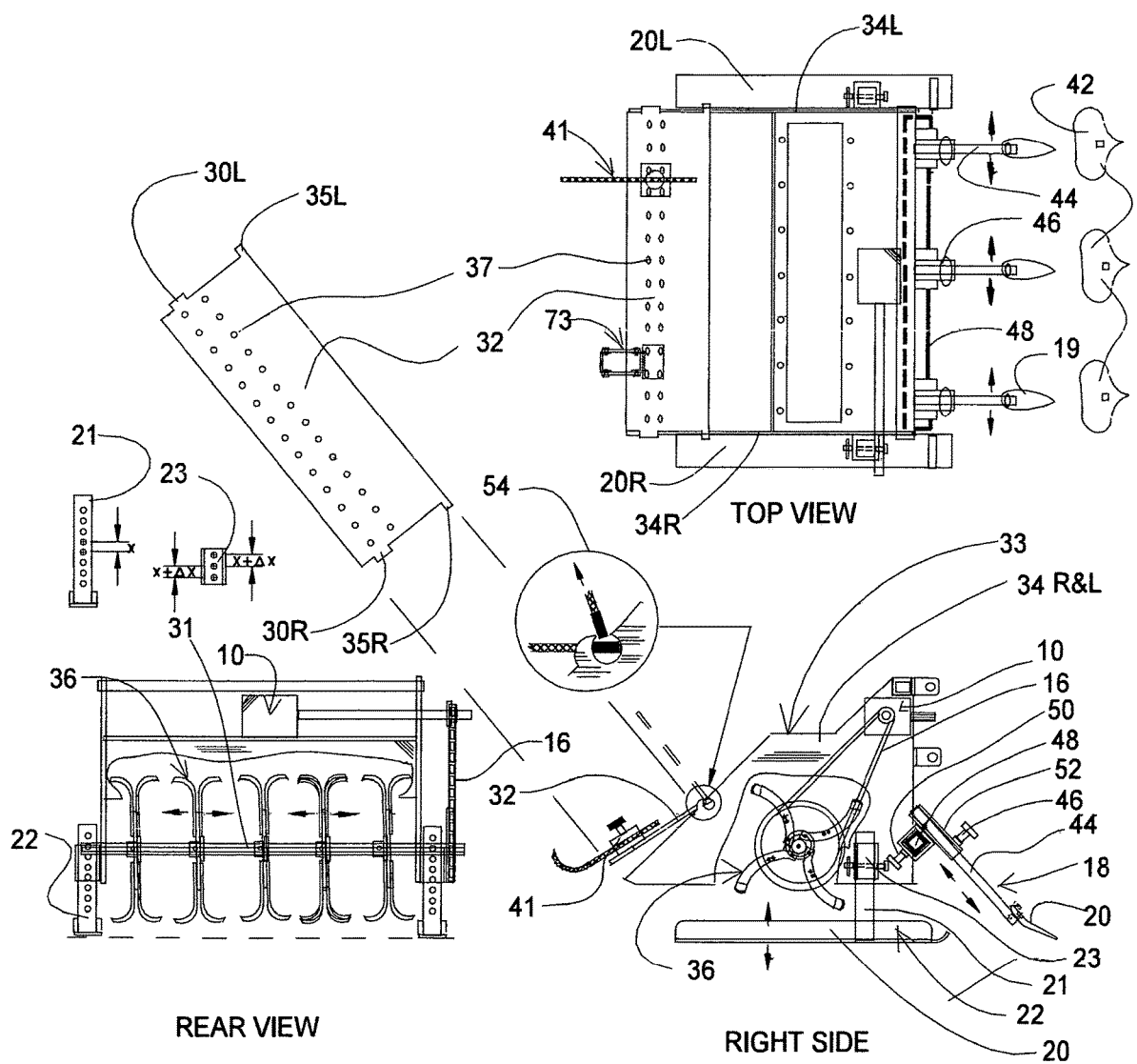
FIG. 2 is an elevation of the central unit showing the crust breakers, rotary tillers, height control skids and the rear leveling and attachment apron.

FIG. 2. is an elevation of the rotary tiller assembly 33. The stand/skid apparatus 22 includes a set of skids 20R&L that control the ground clearance of the tiller. A height control tube 21 and a height control sleeve 23 are patterned to provide fractional control of the height of the tiller assembly by spacing extra holes a fraction $(X+\Delta X)$ greater on the sleeve 23. The rear hinge plate 32 is shown in plan view in the upper left revealing a set of plate stops 30L&R and plate tabs 35L&R that provide connection, swivel, and the release of plate 32 from side plates 34L&R. A magnified view of the swivel and quick release feature 54 shows the release joint in detail. Hinge plate 32 also has attachment mounting holes 37 that provide connections for seeder hinge apparatus 73, marking skids 41 or other rear mounting devices. rotary tiller tines 36 are driven by chain 16 from gearbox 10 and mounted on a shaft 31, which has a key slot that allows for positioning the blades at variable locations. The ground breaking assembly 18 consists of a cross rail 48, adjustment tubes 52 with knobs 46&50, cutter support arms 44 and cutting blades 20. Optional blades 42 can be mounted to widen or narrow the cutting width. The depth of the ground breaker arm assembly 18 is controlled by knob 46 and the lateral spacing by knob 50.

Figure 3:
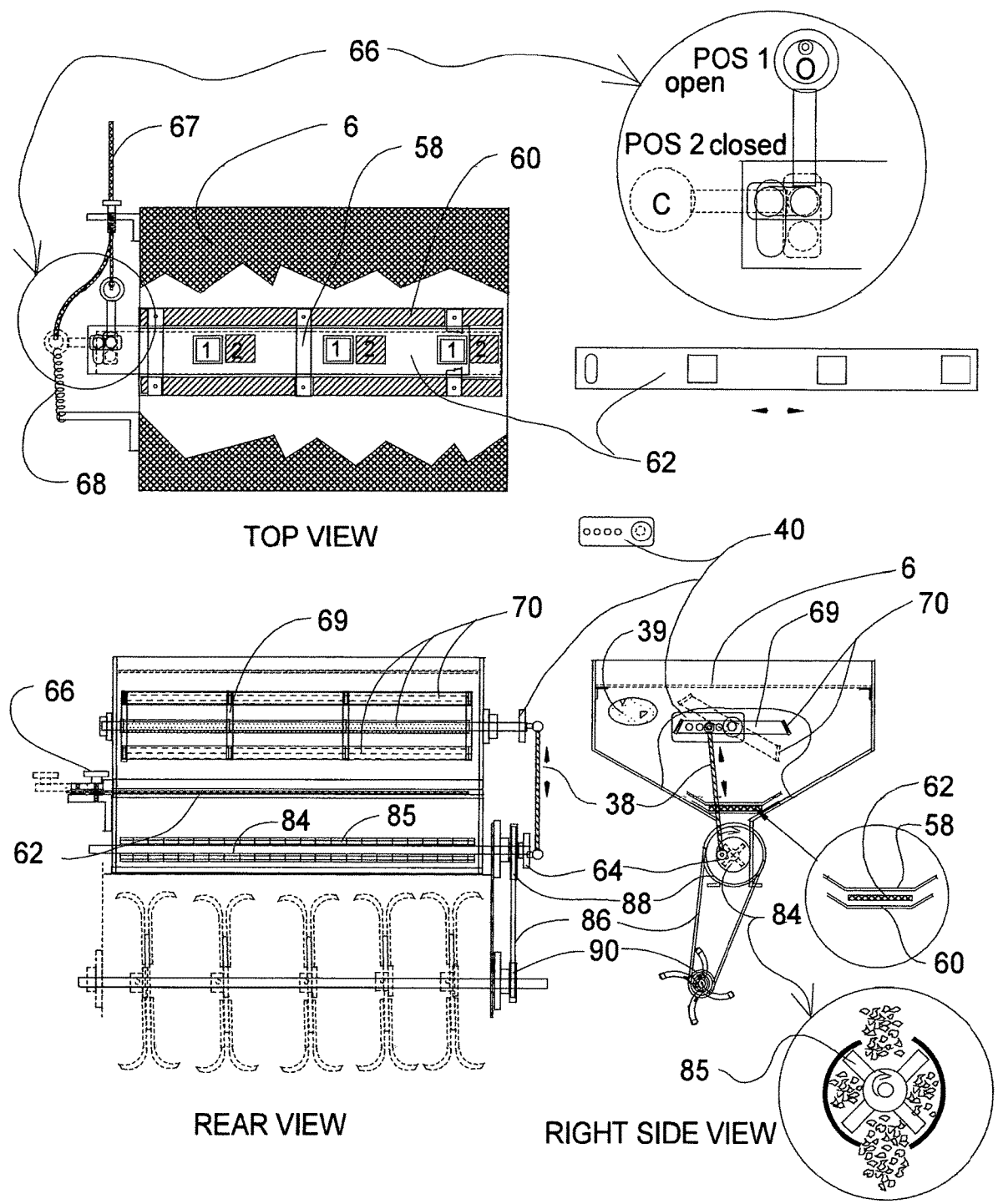
FIG. 3 is an elevation of the fertilizer bin.

FIG. 3 is an elevation of the fertilizer bin apparatus from FIG. 1-8 showing a set of rocker arms 69 and vibrator blades 70 actuated by a reciprocating rod 38 which in turn is driven by a fly wheel 64 driven by secondary drive pulley 90. The amplitude of the rocker arm travel can be varied by connecting bar 40 which has a set of radial holes. The fertilizer 39 once filtered through a screen 6 is fed via gravity and vibrator blades 70 through an adjustable aperture plate 62. The fertilizer is then dispatched evenly via metering bar assembly 84 and blades 85. One preferred method of driving the metering bar 84 is shown by driving a pulley 88 on the shaft via belt or chain 86 from drive wheel 90. The amount of fertilizer to be dispensed is controlled by the position of aperture plate 62 by a lever assembly 66 which is shown to be operated from the tractor via a cable 67. Plate 62 is contained by hold down bars 58 and fixed aperture 60. A return spring 68 will close the aperture plate when cable 67 is released. The fully open and fully closed positions of plate 62 are indicated by Position 1 and 2 of lever assembly 66.

Figure 4:
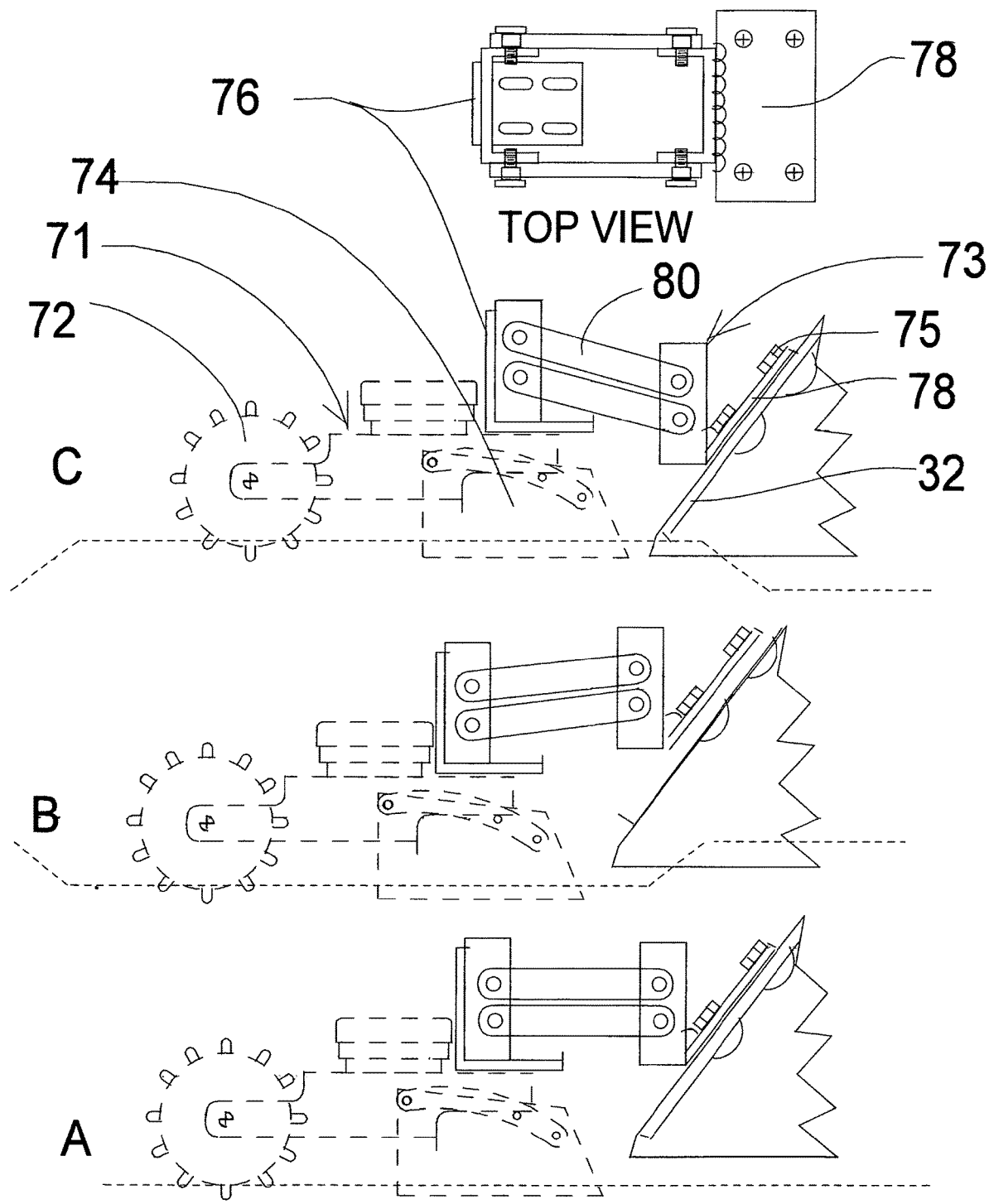
FIG. 4 shows the seeder attachment unit in three operating positions.

FIG. 4 relates to the union of a commercial seeder 71 connected by seeder adapter plate 76 to the seeder attachment assembly 73 which is in turn bolted by hardware 75 to tiller apron 32 via attachment plate 78. Sections A, B and C show three different ground conditions. Condition A shows the seeder on level ground with seeder's depth control 74 at the required depth as determined by the seeder driver drum wheel 72. Condition B shows how the swivel arms 80 of hinge apparatus 73 allow the seeder to drop when in a gulley keeping the depth control constant. Condition C shows the seeder retaining proper depth when encountering an earthan mound.

ADVANTAGES

By combining tools for several garden functions in this instant invention outlined in FIG. 1 the implement will save time from early spring ground preparation, marking rows, fertilizing in the rows, and seeding through mid year then ground clearing, tilling in the roughage and replanting in the fall. The same implement is used to till in the roughage and seed in a cover crop for early spring germination. By incorporating height control skids 22 with a number of settings, each gardening function can be accurately controlled to maximize results. Further, the skids 22 establish a stand for disconnecting the implement and quickly re-connecting it for further use. By attaching the ground breaking assembly 18 to the tiller frame 33 the ground resistance to tilling is lessened as well as the number of passes required to prepare a bed for planting. The hinge plate 32 is balanced to float on the tilled soil to help level the ground as it moves along the bed eliminating additional leveling operations prior to seeding. The plate 32 also has evenly spaced mounting holes for mounting seeder boxes 71, marking skids FIG. 2-41 and other functional tools in several desired numbers and spaces. The fertilizer unit 8 is designed to accommodate packaged fertilizer, compost or animal manure when filtered through the filter screen 6. By positioning the fertilizer bin 8 above and in front of the tiller assembly the fertilizer will be ground into the soil only in the rows to be planted reducing the amount of fertilizer needed and the ability of weeds to grow between rows. Another advantage of the implement is to provide a mount 73 for seeder boxes that will provide consistent depth control of the seed as the ground level varies beneath. Additionally, the tiller blades 36 as shown in FIG. 2 can be arranged as desired along the slotted shaft 31 to allow greater flexibility in ground disturbance. Additionally, by eliminating plowing, the invention can greatly reduce soil erosion and the loss of microbe life caused by deep plowing. Further, eliminating plowing will reduce man and machine hours as well as the hours invested in the disking and leveling required to prepare the soil for planting. By reducing the overall energy required to achieve successful crops over the year, labor and the amount of fuel used will be lessened as well as the corresponding quantity of $CO_2$ released into the atmosphere.

ALTERNATE EMBODIMENTS

The instant embodiment is not dimensioned because the basic design can be useful in many sizes. Scaling the invention to larger, or smaller, can be done by modifying the drawings as required. The aperture control in the fertilizer bin can also be controlled remotely using radio frequency or sonar waves to command a circuit driving a gear motor. The height and or width of the fertilizer bin can be changed to accommodate more material. The fertilizer bin can also be modified to apply seed along with fertilizer in sections or total width of the bin. The hinge assembly for the seeder connection can be modified to accommodate most available seeder boxes.

I claim:
1. A farming and gardening implement, comprising:
   a plurality of skids;
   a ground-breaking assembly;
   a tiller assembly including a rear tiller apron partially surrounding a tiller having a plurality of tines;

a rear hinge plate coupled with the rear tiller apron by a plurality of plate tabs so as to swivel relative to the rear tiller apron;

a fertilizing bin positioned above the tiller assembly when the plurality of skids are supported on a horizontal surface;

a fertilizer filter screen within the fertilizing bin; and a splined shaft configured to connect to a tractor power-take-off shaft.

2. The farming and gardening implement of claim 1, wherein the skids are configured to control depth of cut of the tines of the tiller into ground.

3. The farming and gardening implement of claim 2, wherein the plurality of skids are adjustable and configured to support the farming and gardening implement when the farming and gardening implement is not attached to a tractor.

4. The farming and gardening implement of claim 1, wherein the tiller assembly includes ground cutting blades configured to break up soil in front of the tines of the tiller.

5. The farming and gardening implement of claim 4, wherein the tiller assembly further includes connection tabs configured to attach the farming and gardening implement to tractors having a three point hitch and a power-take-off shaft.

6. The farming and gardening implement of claim 1, further comprising a seeder attachment assembly having an attachment plate configured for coupling with the rear hinge plate and, pivotably coupled with the attachment plate by a plurality of swivel arms, a seeder adapter plate.

7. The farming and gardening implement of claim 1, wherein the rear tiller apron further includes a set of holes for mounting row-marking skids or seeder boxes.

8. The farming and gardening implement of claim 7, wherein the rear tiller apron further includes tabs configured to decouple the rear tiller apron from the farming and gardening implement without hand tools.

9. The farming and gardening implement of claim 1, wherein the fertilizing bin is configured to dispatch material in front of the tines of the tiller.

10. The farming and gardening implement of claim 9, wherein the fertilizing bin further includes an aperture configured to selectively dispatch material.

11. The farming and gardening implement of claim 9, wherein the fertilizing bin further includes an adjustable aperture plate configured to control rate of release of material.

12. The farming and gardening implement of claim 11, wherein the adjustable aperture plate further includes a plurality of openings spaced about 4 inches apart.

13. The farming and gardening implement of claim 12, wherein one or more of the openings of the adjustable aperture plate are configured for control by a connected tractor.

14. The farming and gardening implement of claim 9, wherein the fertilizer filter screen is removable and is configured to limit size of material being dispatched.

15. The farming and gardening implement of claim 9, wherein the fertilizing bin further includes a metering bar configured to distribute fertilizer and prevent the fertilizer from flowing when the fertilizer bin is not operating.

16. The farming and gardening implement of claim 9, wherein the fertilizing bin further includes vibrator blades configured to move fertilizer downward.

17. The farming and gardening implement of claim 16, further comprising a vibrator connection bar configured to set a desired arc length of the vibrator blades.

\* \* \* \* \*